(12) United States Patent
Shihadeh

(10) Patent No.: US 7,027,542 B1
(45) Date of Patent: Apr. 11, 2006

(54) APPARATUS AND METHOD FOR PROVIDING DATA TRANSFER BETWEEN TWO DIGITAL CIRCUITS WITH DIFFERENT CLOCK DOMAINS AND FOR SOLVING METASTABILITY PROBLEMS

(75) Inventor: Elias Shihadeh, Nazareth (IL)

(73) Assignee: Advanced Micro Devices, Inc., Sunnyvale, CA (US)

( * ) Notice: Subject to any disclaimer, the term of this patent is extended or adjusted under 35 U.S.C. 154(b) by 758 days.

(21) Appl. No.: 10/122,624

(22) Filed: Apr. 11, 2002

Related U.S. Application Data

(60) Provisional application No. 60/295,608, filed on Jun. 4, 2001.

(51) Int. Cl.
*H04L 7/00* (2006.01)
(52) U.S. Cl. .................................. 375/354; 375/355
(58) Field of Classification Search ................ 375/354, 375/355, 356; 370/507; 379/508
See application file for complete search history.

(56) References Cited

U.S. PATENT DOCUMENTS

| | | | |
|---|---|---|---|
| 6,359,946 B1* | 3/2002 | Ryan | 375/371 |
| 6,425,088 B1* | 7/2002 | Yasukawa et al. | 713/400 |
| 6,715,095 B1* | 3/2004 | Larsen et al. | 713/600 |

* cited by examiner

*Primary Examiner*—Stephen Chin
*Assistant Examiner*—Nasrin Hoque

(57) ABSTRACT

An apparatus and method is disclosed for avoiding metastability problems during a data transfer between a first circuit operating at first clock frequency and a second circuit operating at a second clock frequency. The first circuit sends an asynchronous control signal to the second circuit. The second circuit samples the asynchronous control signal at least two times and uses at least two samples of the asynchronous control signal to synchronize communication between the first and second circuits. The data is transferred between the first and second circuits when the circuits are synchronized. The second circuit indicates to the first circuit when the data transfer has been completed.

30 Claims, 10 Drawing Sheets

APPARATUS AND METHOD FOR PROVIDING DATA TRANSFER BETWEEN TWO DIGITAL CIRCUITS WITH DIFFERENT CLOCK DOMAINS AND FOR SOLVING METASTABILITY PROBLEMS

The present invention claims priority to U.S. Provisional Application Ser. No. 60/295,608 filed Jun. 4, 2001.

FIELD OF THE INVENTION

The present invention relates to the field of digital circuits. More particularly, the present invention relates to an apparatus and method for transferring data between two digital circuits that operate with different clock domains.

BACKGROUND OF THE INVENTION

Digital systems that have two individual circuits with different clock domains may experience metastability problems when the two individual circuits communicate with each other. Metastability may occur when one of the individual circuits (i.e., a first circuit) activates an internal signal during the sampling clock edge of a clock signal of the other circuit (i.e., a second circuit) at a timing that differs from the setup or hold time of the second circuit clock signal. In such cases, the second circuit will have an undefined value for the sampled signal from the first circuit. This may lead to a malfunction or a fault in the second circuit and affect the behavior of one or more digital systems.

U.S. Pat. No. 5,602,878 discloses a method for asynchronously transferring data from a first synchronous sequential logic circuit that derives its clock source from a first clock to a second synchronous sequential logic circuit that derives its clock source from a second clock, whereby metastability of the second synchronous sequential logic circuit is avoided. The invention comprises a data path and a control path, a data synchronizer coupled to the data path for synchronizing data signals, a control synchronizer coupled to the control path for synchronizing control signals, a register coupled in parallel to the data path for storing valid data output from the data synchronizer, a multiplexer having one input coupled to the data path, another input coupled to the register, a selector input coupled to the control path for selecting between receiving as input synchronized data signals or the contents of the register, and an output for transmitting valid data. If metastability is unlikely, the control signal is de-asserted, causing the multiplexer to select the synchronized data as input. If metastability is likely, the synchronized control signal is asserted, causing the multiplexer to select the register as input. The basic test is whether to accept the new state of the data signal, or wait and use the old state currently maintained in the register, until such time as the likelihood of metastability has passed, as indicated by the synchronized control signal.

In the device disclosed in U.S. Pat. No. 5,602,878, there are two digital circuits, only one of which (i.e., the first circuit) is sending data to the other circuit (i.e., the second circuit). There is no way for the first circuit to receive data from the second circuit. The control signals and the data bus have separate synchronizers, which requires two flip-flops per synchronization and therefore, the synchronization depth must be identical for both of them. There is a requirement for a minimum time window of the control signal in order to function correctly. There is a possibility, that the circuit will have an unsynchronized status, wherein that status old data is used.

U.S. Pat. No. 5,256,912 discloses a synchronizer that utilizes a plurality of clocking signals generated by a specialized clocking circuit, in conjunction with synchronizer modules incorporating transparent latches, to synchronize signals passing from a first clock domain to a second clock domain. Two types of synchronizer modules are disclosed, a single synchronizer module and a multiple synchronizer module. Both types of synchronizer modules utilize a "basic synchronizer cell" comprised of two transparent latches in series. The single synchronizer module is comprised of two such basic synchronizer cells, and utilizes a plurality of clocking signals that are coupled to the transparent latches to accomplish synchronization. The multiple synchronizer module also utilizes a plurality of clocking signals, and is comprised of a plurality of single synchronizer modules coupled in parallel and a synchronizer selector circuit. The multiple synchronizer module operates by initially coupling the signal to be synchronized to the synchronizer selector circuit, which then sequentially couples the signal to successive single synchronizer modules.

The device disclosed in U.S. Pat. No. 5,256,912 enables each of the circuits to transfer data to the other circuit by using the same basic cell, but there is no way for one circuit to request and receive data from the other circuit. In order to synchronize between the two circuits, there is a need to generate a series of four new clocks.

U.S. Pat. No. 5,291,529 discloses a method for improving the performance of the transferring of transaction handshakes between sections of synchronous logic which are in different timing domains, providing immunity from set-up and hold violations and associated problems of metastability, by reducing the time overhead required for signal synchronization.

U.S. Pat. No. 5,132,990 discloses a synchronizer that samples and stores the synchronized data with a transparent latch instead of a flip-flop or similar device to avoid the long set-up time required by such devices. The synchronizer compares its input level to its output level. When they are found to be different because of an input data change, the difference is used to gate the system clock, which in turn gates the transparent latch to sample and store the changed input data level as the new data output level. Since the change in the input data gates the system clock, which further gates the opening of the latch, the input data is essentially guaranteed to fulfill the latch set-up time requirements. For the difficult case in which the input data change occurs as the clock is changing states, a Schmidt trigger is inserted ahead of the latch gating input. The Schmidt trigger will both respond and provide a proper pulse width and magnitude to drive the latch without metastability, or it will pass a "runt pulse" and not respond to it. The latch gating input likewise will not respond to the "runt pulse" because of the pulse's insufficient duration or level. Thus, the Schmidt trigger acts as a matched filter to prevent metastability problems from any runt pulses. All the methods described above have not yet provided satisfactory solutions to the problem of metastability that occurs during two-way communications between circuits having different clock domains.

It would therefore be desirable to have an apparatus and method that is capable of transferring data in a write/read operation between individual circuits that have different clock domains without experiencing metastability problems during the data transfer.

SUMMARY OF THE INVENTION

The present invention is directed to a method for transferring data with a write/read operation between a first circuit coupled to a data bus and operating at first clock frequency and a second circuit coupled to the data bus and operating at a second clock frequency. The second clock frequency is asynchronous with respect to the first clock frequency. A state machine controls the write/read operations in the first circuit. When the state machine receives a request to transfer data with a write/read operation the state machine sets at least one starting signal to initiate a write/read operation in the first circuit. The state machine sets at least one address signal to address the data to the second circuit.

The present invention synchronizes the first circuit and the second circuit. Then the data bus containing the data is activated to capture the current data on the data bus. Then the data is written from the first circuit into the second circuit. Alternatively, the data is read into the first circuit from the second circuit. After the data transfer has been completed, the data bus is deactivated and a first signal is set that indicates that the data transfer has been completed.

The state machine may change states at each rising edge or at each falling edge of the first clock frequency. The data bus may be inactivated after a predetermined delay operation that allows a reading operation of current data that appears on the data bus by the first circuit. The data bus may also be inactivated after a predetermined delay operation that allows a writing operation of current data that appears on the data bus into the second circuit. The predetermined delay may be created by a pair of serially connected D-flip-flop circuits.

The delay time may be extended by inverting the clock input of a first D-flip-flop circuit with respect to a second D-flip-flop circuit.

In one advantageous embodiment of the present invention, the state machine is capable of operating in an idle state, operating in an active write/read state, and operating in a waiting state to delay any further write/read operation before terminating an active write/read state.

The present invention is also directed to an apparatus for transferring data with a write/read operation between a first circuit coupled to a data bus, where the first circuit operates at a first clock frequency, and at least one second circuit coupled to the data bus, where the at least one second circuit operates at a second clock frequency. The second clock frequency is asynchronous with respect to the first clock frequency.

The apparatus comprises a state machine in the first circuit that is capable of controlling a write/read operation in the first circuit; circuitry for inputting to the state machine a request to transfer data with a write/read operation at the first circuit; circuitry for setting at least one starting signal for initiating a write/read operation at the first circuit; circuitry for setting at least one address signal for addressing data to the at least one second circuit by the first circuit.

The apparatus also comprises circuitry for inactivating the data bus containing the data to capture current data on the data bus; circuitry for synchronizing the first circuit and the at least one second circuit; and circuitry for writing/reading data from/into the first circuit into/from the at least one second circuit.

It is an object of the present invention to provide an apparatus and method for transferring data between a first circuit operating at a first clock frequency and a second circuit operating at a second clock frequency.

It is another object of the present invention to provide an apparatus and method that avoids metastability problems when data is transferred between a first circuit having a first clock frequency and a second circuit having a different clock frequency.

It is also an object of the present invention to provide an apparatus and method to synchronize two individual circuits that operate at two different clock frequencies.

Other objects and advantages of the invention will become apparent as the description proceeds.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior, as well as future uses of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital circuits having different clock domains.

Whenever there is a request for a data transfer between different digital circuits on a common data bus, either by writing data from a first circuit to a second circuit, or by reading data into the first circuit from the second circuit, an exact copy of the data must be transferred. When transferring an exact copy of the data between the digital circuits, even though the digital circuits have different clock domains, it is necessary to avoid any malfunction in the operation of these digital circuits (i.e., avoiding metastability).

Figure 1:
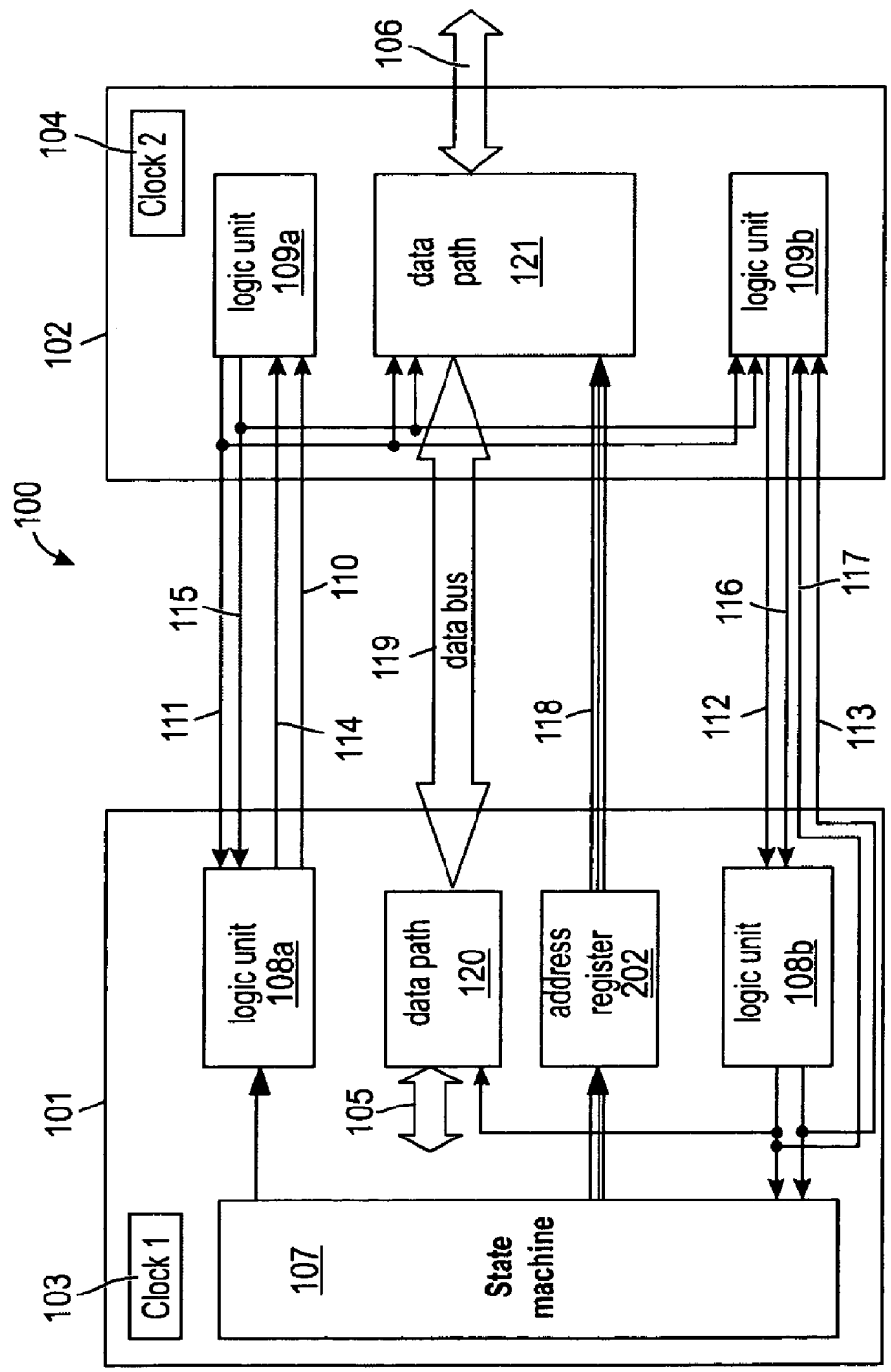
FIG. 1 schematically illustrates a block diagram of an apparatus capable of transferring data between a first digital circuit and a second digital circuit according to an advantageous embodiment of the invention.

FIG. 1 schematically illustrates a block diagram of digital system 100 for data transfer between two digital circuits having different clock domains and a common data bus, according to an advantageous embodiment of the invention. Data transfer in digital system 100 is performed, either by writing data from a first circuit 101 to a second circuit 102, or either by reading data into the first circuit 101 from the second circuit 102. Digital system 100 comprises two digital circuits, first digital circuit 101 and second digital circuit 102. Each of the two digital circuits has its own clock domain. First digital circuit 101 has a first clock frequency 103 (first clock domain 103). Second digital circuit 102 has a second clock frequency 104 (second clock domain 104). The relationship between the first clock domain 103 and the second clock domain 104 can be as follows:

(1) The first clock frequency 103 is greater than the second clock frequency 104.

(2) The first clock frequency 103 is less than or equal to the second clock frequency 104.

First digital circuit 101 (also referred to as first circuit 101) and second digital circuit 102 (also referred to as second circuit 102) communicate by using the following signals:

(1) 1st_data_write signal 110 is set by the first circuit 101 to indicate when a data write operation is started.

(2) 1st_data_read signal 114 is set by the first circuit 101 to indicate when a data read operation is started.

(3) 1st_sel_reg_k signal 118 (where k=0, . . . , N) is a group of N+1 signals, only one of which can be activated during a write or read operation. These signals are set together with either 1st_data_write 110 and 1st_data_read 114.

(4) 1st_write_done signal 113 is set at the end of the method indicating the end of the write operation.

(5) 1st_read_done signal 117 is set at the end of the method indicating the end of the read operation.

(6) 2nd_din_latch signal 111 is set by the second circuit 102 to indicate that the data written from the first circuit 101 is latched into a "data in" register in the second circuit 102.

(7) 2nd_dout_latch signal 115 is set by the second circuit 102 to indicate to the first circuit 101 that it has put the data to be read into a "data out" register inside it, so that the first circuit 101 will be able to read it.

(8) 2nd_write_done signal 112 is set by the second circuit 102 to indicate that it has completed its part in the write operation.

(9) 2nd_read_done signal 116 is set by the second circuit 102 to indicate that it has completed its part in the read operation.

(10) Data bus 119 is a bi-directional tri-state data bus used by both first circuit 101 and second circuit 102 to transfer data between them.

In addition to clock 103, first circuit 101 comprises control logic units 108a and 108b for controlling the signals that were described above. In addition to clock 104, second circuit 102 comprises control logic units 109a and 109b for controlling the signals that were described above. Address register 202, data path 120, and data path 121 are provided for controlling the data flow from inside and outside of first circuit 101 and second circuit 102. Input/output buses (I/O buses) 105, 106 are used for communicating with external circuits connected to system 100 and for importing the data to be transferred between first circuit 101 and second circuit 102. Both first circuit 101 and second circuit 102 are reset by the same reset signal 150 (shown in FIG. 2A).

According to one advantageous embodiment of the invention, first circuit 101 is the master circuit that controls (1) write operations that write data from first circuit 101 to second circuit 102 and (2) read operations that read data into first circuit 101 from second circuit 102. First circuit 101 further comprises a state machine 107. State machine 107 is a computing device designed with the operational states required for the operation of first circuit 101 (i.e., the master circuit) to transfer data to and from other digital circuits (i.e., the slave circuits).

State machine 107 has at least the following states:

(1) An "idle" state, in which there is no writing or reading of data between first circuit 101 and second circuit 102.

(2) A "start write/read" state, in which an active write/read signal is set in order to start a write/read operation between the first circuit 101 and the second circuit 102, and in order to inactivate the common data bus 119.

(3) A "waiting" state, during which any further write/read operation is delayed until the completion of the active write/read state.

The conditions for state changing are as follows:

(1) From "idle" state to "start write/read" state: upon receiving a write or read request.

(2) From "start write/read" state to "waiting" state: upon activating write or read signal(s).

(3) From "waiting" state to "idle" state: upon receiving a signal indicating that the write or read operation has been completed.

The state machine 107 may change state or repeat on the same state according to a trigger (e.g., the rising edge of the first clock frequency 103).

Control logic unit 108a receives at its input, from state machine 107, a starting signal for activating a write or a read operation and outputs the 1st_data_write signal 110 or 1st_data_read signal 114 to control logic unit 109a. Control logic unit 109a outputs the 2nd_din_latch signal 111 or 2nd_dout_latch signal 115 after performing a required delay that is needed in order to obtain the data transfer without having any data loss or metastability. Control logic unit 109a outputs 2nd_din_latch signal 111 or 2nd_dout_latch signal 115 to control logic unit 108a in order to activate the common data bus 119. Control logic unit 109a also outputs 2nd_din_latch signal 111 or 2nd_dout_latch signal 115 to control logic unit 109b. Control logic unit 109b sets and outputs 2nd_write_done signal 112 or 2nd_read_done signal 116 to control logic unit 108b. Control logic unit 108b outputs a signal to state machine 107 that indicates that the write or read operation has been completed.

Address register 202 determines which registers in data path 121 will store the data from the write operation. Address register 202 also determines the registers in data path 121 from which data will be read and transferred to the master circuit (i.e., to first circuit 101).

The FIG. 2A, FIG. 2B, FIG. 4A and FIG. 4B illustrate different examples for performing a data transfer between digital circuits having different clock domains and a common data bus, according to an advantageous embodiment of the invention.

Figure 2A:
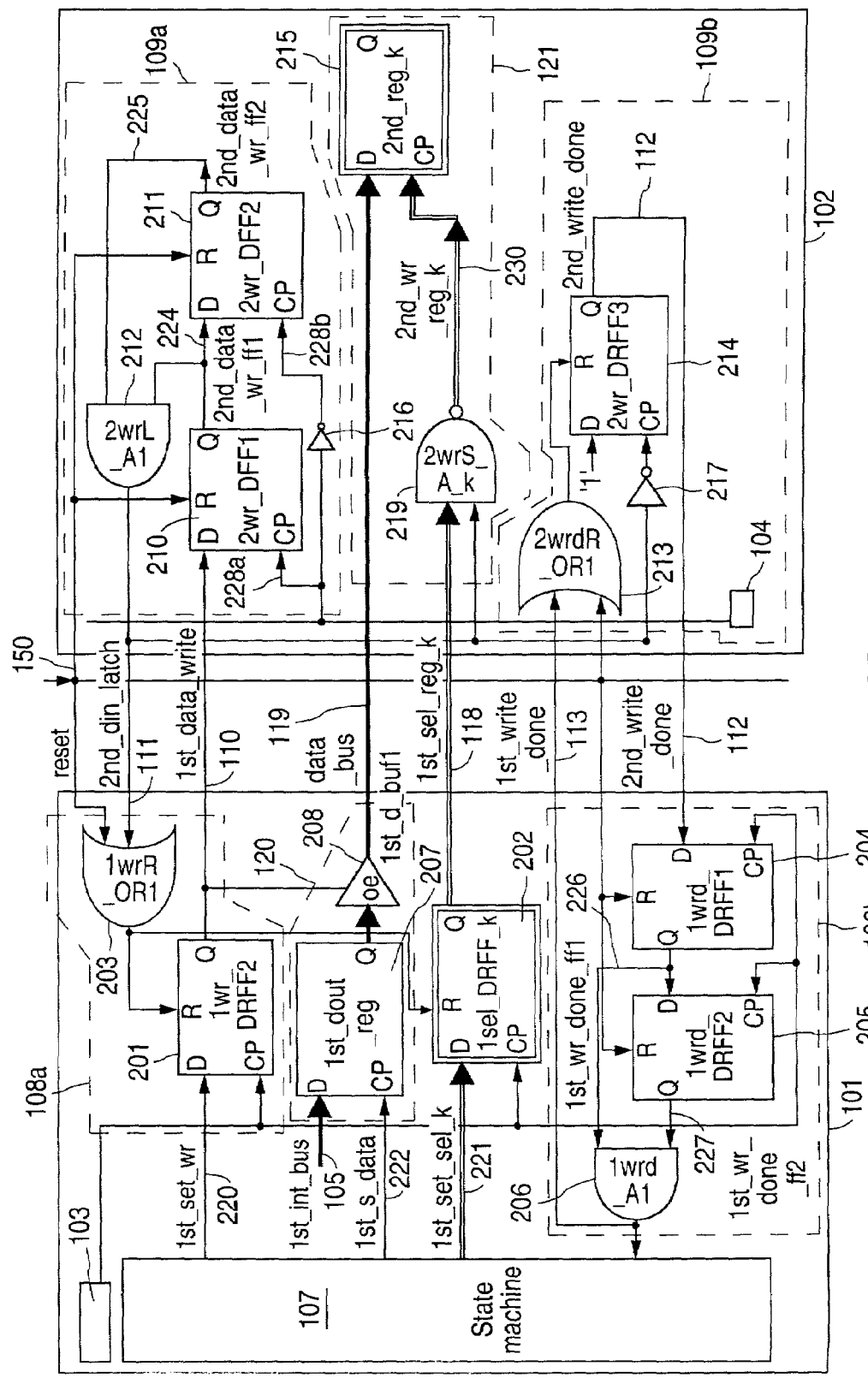
FIG. 2A schematically illustrates more detailed block diagram showing a first case of a write operation from a first digital circuit to a second digital circuit according to an advantageous embodiment of the invention.

FIG. 2A schematically illustrates a first case of a write operation between first circuit 101 and second circuit 102, in which the clock frequency domain 103 of the first circuit 101 is greater than the clock frequency domain 104 of the second circuit 102. In order to perform the write operation, the following elements are used:

First circuit 101 comprises state machine 107, control logic unit 108a, control logic unit 108b, a set of flip-flops such as 1sel_DRFF_k 202 (where k=0, . . . , N and where N+1 is the maximum number of registers in second circuit 102) and data path 120. Control logic unit 108a comprises flip-flop 1wr_DRFF1 201 and a logic OR gate 1wrR_OR1 203. Control logic unit 108b comprises two flip-flops 1wrd_DRFF1 204 and 1wrd_DRFF2 205 and a logic AND gate 1wrd_A1 206. Data path 120 comprises register 1st_dout_reg 207 and an output tri-state buffer 1st_d_buf1 208 with an enable signal "oe" for each data bit.

Second circuit 102 comprises control logic unit 109a, control logic unit 109b, and a set of N+1 registers 2nd_reg_k 215 (where k=0, . . . , N). Control logic unit 109a comprises flip-flops 2wr_DFF1 210 and 2wr_DFF2 211, a logic AND gate 2wrL_A1 212 and an inverter 216. Control logic unit 109b comprises a logic OR gate 2wrdR_OR1 213, flip-flop 2wr_DRFF3 214 and an inverter 217. Registers 2nd_reg_k 215 are read/write-accessed registers, which are used for controlling other parts of second circuit 102 (not shown in FIG. 2A) or for holding data from other inputs to second circuit 102, such as the input of a write operation from first circuit 101. Inverter 216 is used to add delay on clock 104 of second circuit 102 while writing data from first circuit 101 to second circuit 102, in order to obtain synchronization between first circuit 101 and second circuit 102.

Figure 3A:
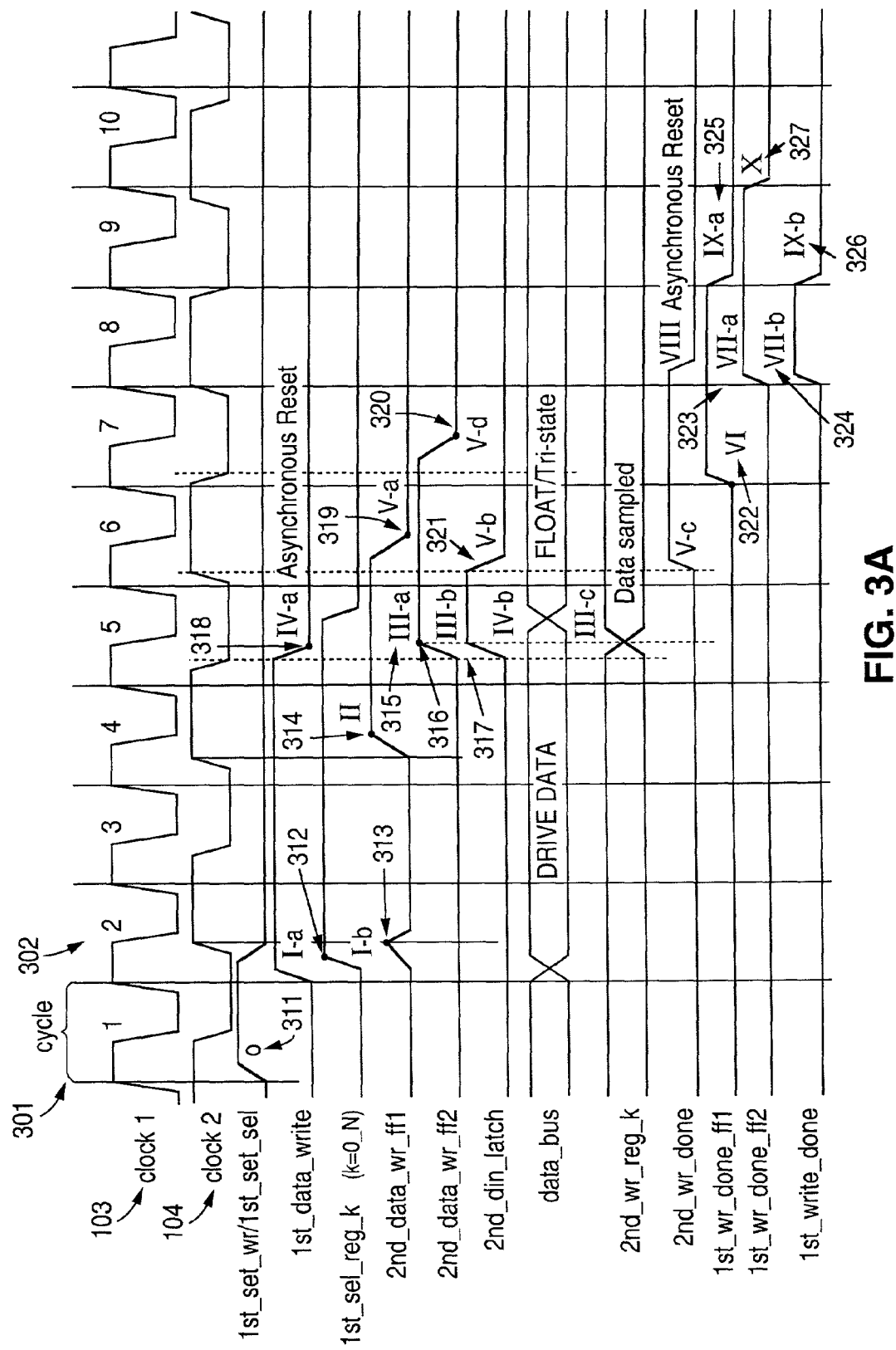
FIG. 3A is a timing diagram illustrating the operation of the first case of a write operation shown in FIG. 2A.

In first circuit 101 with clock domain 103, the state machine 107 initiates the write operation by setting signal 1st_set_wr 220 to a "high" voltage level at the first cycle of clock 103, as shown in the timing diagram of FIG. 3A by event zero ("0") (designated with reference numeral 311) at the first clock cycle 301. At the same time, the state machine 107 sets one of the N+1 select signals 1st_set_sel_k 221 (k=0, 1 . . . , N) and also arranges the data to be written into register 1st_dout_reg 207 by setting the sampling signal 1st_s_data 222 at the same first cycle 301 of clock 103.

In the next event "I-a" (designated by reference numeral 312) at clock cycle 302, the flip-flop 1wr_DRFF1 201 sets the output signal 1st_data_write 110 on the rising edge of the first clock 103. This signal, 1st_data_write 110, enables the output buffer 1st_d_buf1 208 to drive out the data to the data bus 119. So, at this time the data that will be written from the first circuit 101 to the second circuit 102 is valid. At this clock cycle (designated with reference numeral 302) the three signals 1st_set_wr 220, 1st__data 222 and the appropriate signal of the 1st_set_sel_k 221 (k=0, 1, N) will be inactivated by the state machine 107.

The second circuit 102 will sample the signal 1st_data_write 110 into flip-flop 2wr_DFF1 210 on the rising edge of the second clock 104 to generate signal 2nd_data_wr_ff 224. If the setup time or hold time of the signal 1st_data_write 110 relative to the second clock 104 is not enough to generate a stable signal in the output of 2wr_DFF1 210 (i.e., signal 2nd_data_wr_ff1 224), this signal, 2nd_data_wr_ff1 224, will have an undefined logic value or metastability state as shown in the timing diagram of FIG. 3A by the small spike (i.e., event "I-b" designated by reference numeral 313). This small spike will either decline to a zero ("0") state (i.e., a low level voltage value) or will be able to go to a one ("1") state (i.e., a high level voltage value). In FIG. 3A, the signal 2nd_data_wr_ff1 224 is shown declining to a zero ("0") state so that at the next rising edge of the second clock 104 (i.e., event "II" designated with reference numeral 314) the signal 2nd_data_wr_ff1 224 will be set to a one ("1") level while 2nd_data_wr_ff2 225 is still at the zero ("0") level.

The signal 2nd_data_wr ff1 224 will be sampled on the next falling edge of the second clock 104 into flip flop 2wr_DFF2 211 (i.e., event "III-a" designated with reference numeral 315), causing signal 2nd_data_wr_ff2 225 to be set to a one ("1") level. When 2nd_data_wr_ff2 225 is set to the one ("1") level it goes to logic AND gate 2wrL_A1 212 together with the signal 2nd_data_wr_ff1 224 and generates the signal 2nd_din_latch 111 (shown in the timing diagram of FIG. 3A as event "III-b" designated with reference numeral 317).

The metastability problem is solved by sampling the asynchronous signal 1st_data_write 110 from first circuit 101 two times within control logic unit 109a of second circuit 102. Signal 1st_data_write 110 is first sampled in flip flop 2wr_DFF1 210 using the second clock 104 as the Clock Pulse (CP) input 228a for flip-flop 2wr_DFF1 210 to generate signal 2nd_data_wr_ff1 224. Signal 2nd_data_wr_ff1 224 is then sampled in flip flop 2wr_DFF2 211 using second clock signal 104 (through inverter 216) as the Clock Pulse (CP) input 228b for flip-flop 2wr_DFF2 211 to generate 2nd_data_wr_ff2 225.

The output signal 2nd_data_wr_ff1 224 from flip-flop 2wr_DFF1 210 and the output signal 2nd_data_wr_ff2 225 from flip-flop 2wr_DFF2 211 are provided to the inputs of the logic AND gate 2wrL_A1 212 which performs a logical AND operation. The output of the logic AND gate 2wrL_A1 212 will not go to a one ("1") level unless both signals, 2nd_data_wr_ff1 224 and 2nd_data_wr_ff2 225, are set to the one ("1") level. The second signal 2nd_data_wr_ff2 225 will not be set to the one ("1") level unless the first signal 2nd_data_wr_ff1 224 has a stable one ("1") level on the second sampling edge of the second clock 104 (shown in the timing diagram of FIG. 3A by event "III-a" designated with reference numeral 315). This guarantees that the signal 2nd_din_latch 111 will not be activated by a metastability state in 2nd_data_wr_ff1 224. That is, the signal 2nd_din_latch 111 will not be set unless the output of both flip-flop 2wr_DFF1 210 and flip-flop 2wr_DFF2 211 are set.

In the other direction, when the signal 2nd_din_latch 111 is to be reset (i.e., inactivated to a zero ("0") level) there is no metastability problem because the signal 1st_data_write 110 is inactivated synchronously to the second clock 104.

The rising edge of signal 2nd_din_latch 111, together with one of the signals 1st_selreg_k 118 (k=0, 1, ..., N), through a chosen gate from the group of logic "NAND" gates 2wrS_A_k 219, sets the appropriate signal from the group 2nd_wr_reg_k 230 (k=0, 1, ..., N) that corresponds to the same "k" of the signal 1st_sel_reg_k 118 set by the first circuit 101. The generated signal 2nd_wr_reg_k 230 samples the data transferred from the first circuit 101 to the second circuit 102 on the data bus 119 into the appropriate register from the group of registers 2nd_reg_k 215 (k=0, 1, ..., N) (shown in the timing diagram of FIG. 3A as event "III-c").

The signal 2nd_din_latch 111 goes also at its rising edge to the first circuit 101 through the OR gate 1wrR_OR1 203 to both flip-flops 1wr_DRFF1 201 and 1sel_DRFF_k 202 to asynchronously reset signal 1st_data_write 110 and the appropriate signal from the group 1st_sel_reg_k 118 (k=0, 1, ..., N) (shown in the timing diagram of FIG. 3A as event "IV-a" designated with reference numeral 318).

The inactivation of signal 1st_data_write 110 during the rising edge of signal 2nd_din_latch 111 will disable the output buffer 1st_d_buf1 208 in the first circuit 101, and thus the data bus 119 will be in the "Float" or "Tri-state" status (shown in the timing diagram of FIG. 3A as event "IV-b").

The inactivation of the signal 1st_data_write 110 is synchronized with the falling edge of the second clock 104. The change is sampled by the next rising edge of the second clock 104 into flip-flop 2wr_DFF1 210, causing 2nd_data_wr_ff1 224 to inactivate to the zero ("0") level (shown in the timing diagram of FIG. 3A as event "V-a" designated with reference numeral 319). This sampling will not generate any metastability problem in the second circuit 102, so it can be used directly without any need for sampling it twice, and consequently, signal 2nd_din_latch 111 will be inactivated to the zero ("0") level, causing the write operation into the second circuit 102 to be done. At this time, the data transferred from the first circuit 101 to the second circuit 102 is sampled in the selected register in the second circuit 102.

The signal 2nd_data_wr_ff1 224 will be sampled into flip-flop 2wr_DFF2 211 causing signal 2nd_data_wr_ff2 225 to go inactive on the next falling edge of the second clock 104 (shown in the timing diagram of FIG. 3A by event "V-d" designated by reference numeral 320).

The falling edge of signal 2nd_din_latch 111 (shown in the timing diagram of FIG. 3A as event "V-b" designated by reference numeral 321) will pass through the inverter 217, causing flip-flop 2wr_DRFF3 214 to set signal 2nd_write_done 112 to the one ("1") level (shown in the timing diagram of FIG. 3A as event "V-c").

Signal 2nd_write_done 112 will go from the second circuit 102 to the first circuit 101, and will be sampled twice by the first clock 103 into the flip-flops 1wrd_DRFF1 204 and 1wrd_DRFF2 205, setting two signals 1st_wr_done_ff1 226 and 1st_wr_done_ff2 227 in two consequent cycles of the first clock (shown in the timing diagram of FIG. 3A as event "VI" designated by reference numeral 322 and as event "VII-a" designated by reference numeral 323). The sampling is done in the same manner previously described for sampling 1st_data_write 110 by the second circuit 102, but now both samples are done on the rising edge of the first clock 103.

The metastability problem is solved by sampling the asynchronous signal 2nd_write_done 112 from second circuit 102 two times within control logic unit 108b of first circuit 101. Signal 2nd_write_done 112 is first sampled in flip flop 1wrd_DRFF1 204 using the first clock 103 as the Clock Pulse (CP) input for flip-flop 1wrd_DRFF1 204 to generate signal 1st_wr_done_ff1 226. Signal 1st_wr_done_ff1 226 is then sampled in flip flop 1wrd_DRFF2 205 using first clock signal 103 as the Clock Pulse (CP) input for flip-flop 1wrd_DRFF2 205 to generate 1st_wr_done_ff2 227.

The output signal 1st_wr_done_ff1 226 from flip-flop 1wrd_DRFF1 204 and the output signal 1st_wr_done_ff2 227 from flip-flop 1wrd_DRFF2 205 are provided to the inputs of the logic AND gate 1wrd_A1 206 which performs a logical AND operation. The output of the logic AND gate 1wrd_A1 206 is signal 1st_write_done 113. Signal 1st_write_done 113 will not be set to the one ("1") level unless both signals, 1st_wr_done_ff1 226 and 1st_wr_done_ff2 227, are set to the one ("1") level (shown in the timing diagram of FIG. 3A as event "VII-b" designated with reference numeral 324).

The second signal 1st_wr_done_ff2 227 will not be set to the one ("1") level unless the first signal 1st_wr_done_ff1 226 has a stable one ("1") level on the second rising edge of the first clock 103. This guarantees that the signal 1st_write_done 113 will not be activated by a metastability state in 1st_wr_done_ff1 226. That is, the signal 1st_write_done 113 will not be set unless the outputs of both flip-flop 1wrd_DRFF1 204 and flip-flop 1wrd_DRFF2 205 are set.

In the other direction, when the signal 1st_wr_done_ff1 226 is to be reset (i.e., inactivated to a zero ("0") level) there is no metastability problem because the signal 2nd_write_done 112 is inactivated synchronously to the first clock 103.

On the rising edge of the signal 1st_wr_done_ff2 227 (shown in the timing diagram of FIG. 3A as event "VII-a" designated with reference numeral 323), the output of the logic AND gate 1wrd_A1 206 (i.e., signal 1st_write_done 113) will be set to the one ("1") level because both signal 1st_wr_done_ff1 226 and signal 1st_wr_done_ff2 227 will be at the one ("1") level (shown in the timing diagram of FIG. 3A as event "VII-b" designated with reference numeral 324).

The signal 1st_write_done 113 will go back to the second circuit 102 through logic OR gate 2wrdR_OR1 213 and asynchronously reset flip-flop 2wr_DRFF3 214 causing signal 2nd_write_done 112 to go inactive (shown in the timing diagram of FIG. 3A as event "VIII").

The inactivation of signal 2nd_write_done 112 is done with synchronization of the first clock domain 103, so that the next rising edge of the first clock 103 will sample it as a zero ("0") level and cause signal 1st_wr_done_ff1 226 to go inactive to the zero ("0") level (shown in the timing diagram of FIG. 3A as event "IX-a" designated with reference numeral 325).

The inactivation of the signal 1st_wr_done_ff1 226 will inactivate the signal 1st_write_done 113 (shown in the timing diagram of FIG. 3A as event "Ix-b" designated with reference numeral 326). Signal 1st_wr_done_ff1 226 will be sampled on the next rising edge of the first clock 103. This will cause signal 1st_wr_done_ff2 227 to be inactivated as well (shown in the timing diagram of FIG. 3A as event "X" designated with reference numeral 327).

The state machine 107 can use the activation of the signal 1st_write_done 113 to complete its write operation sequence.

FIG. 3A shows the setting of the signals and the timing related to the signals in a first case of a write operation from the first circuit 101 to the second circuit 102 according to FIG. 2A. The first case represents a write operation when the first clock frequency 103 of the first circuit 101 is faster than the second clock frequency 104 of the second circuit 102.

Figure 2B:
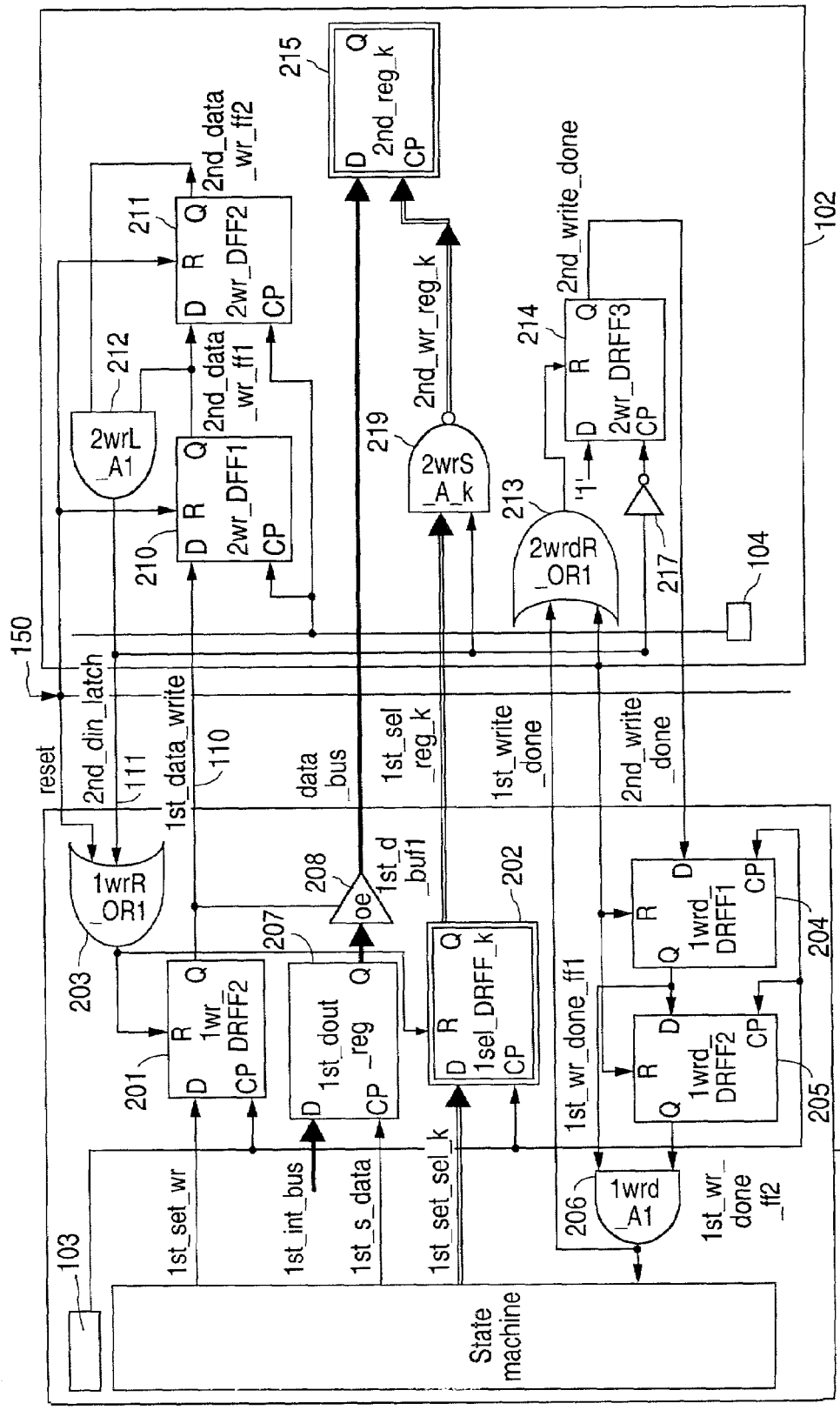
FIG. 2B schematically illustrates a more detailed block diagram showing a second case of a write operation from a first digital circuit to a second digital circuit according to an advantageous embodiment of the invention.

FIG. 2B schematically illustrates a second case of a write operation from first circuit 101 to second circuit 102, according to an alternate advantageous embodiment of the invention. In this second case, the clock frequency 103 of the first circuit 101 is slower than the clock frequency 104 of the second circuit 102. Therefore the inverter 216 that was used in second circuit 102 of FIG. 2A is deleted from the second circuit 102 as shown in FIG. 2B. Except for not using inverter 216, the write operation that is performed in the second case is identical to the write operation that is performed in the first case as described above with reference to FIG. 2A and FIG. 3A.

Figure 3B:
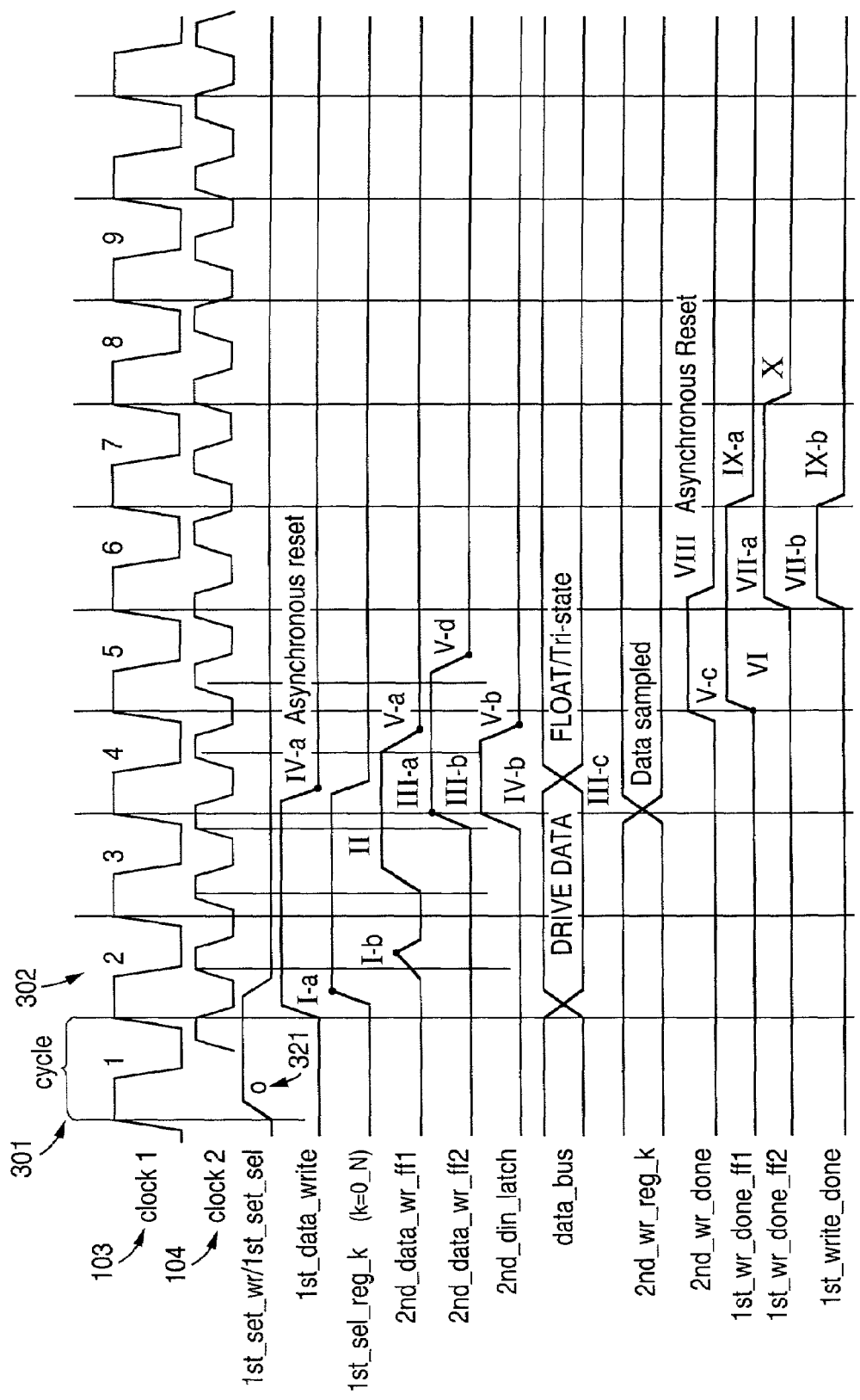
FIG. 3B is a timing diagram illustrating the operation of the second case of a write operation shown in FIG. 2B.

FIG. 3B shows the setting of the signals and the timing related to the signals in the second case of a write operation from first circuit 101 and second circuit 102. The second case represents a write operation where the first clock frequency 103 of the first circuit 101 is slower than the second clock frequency 104 of the second circuit 102. In addition, the timing of the write operation in the second case is shorter than the timing of the write operation in the first case as can be easily seen by comparing the timing diagrams of FIG. 3A and FIG. 3B.

Figure 4A:
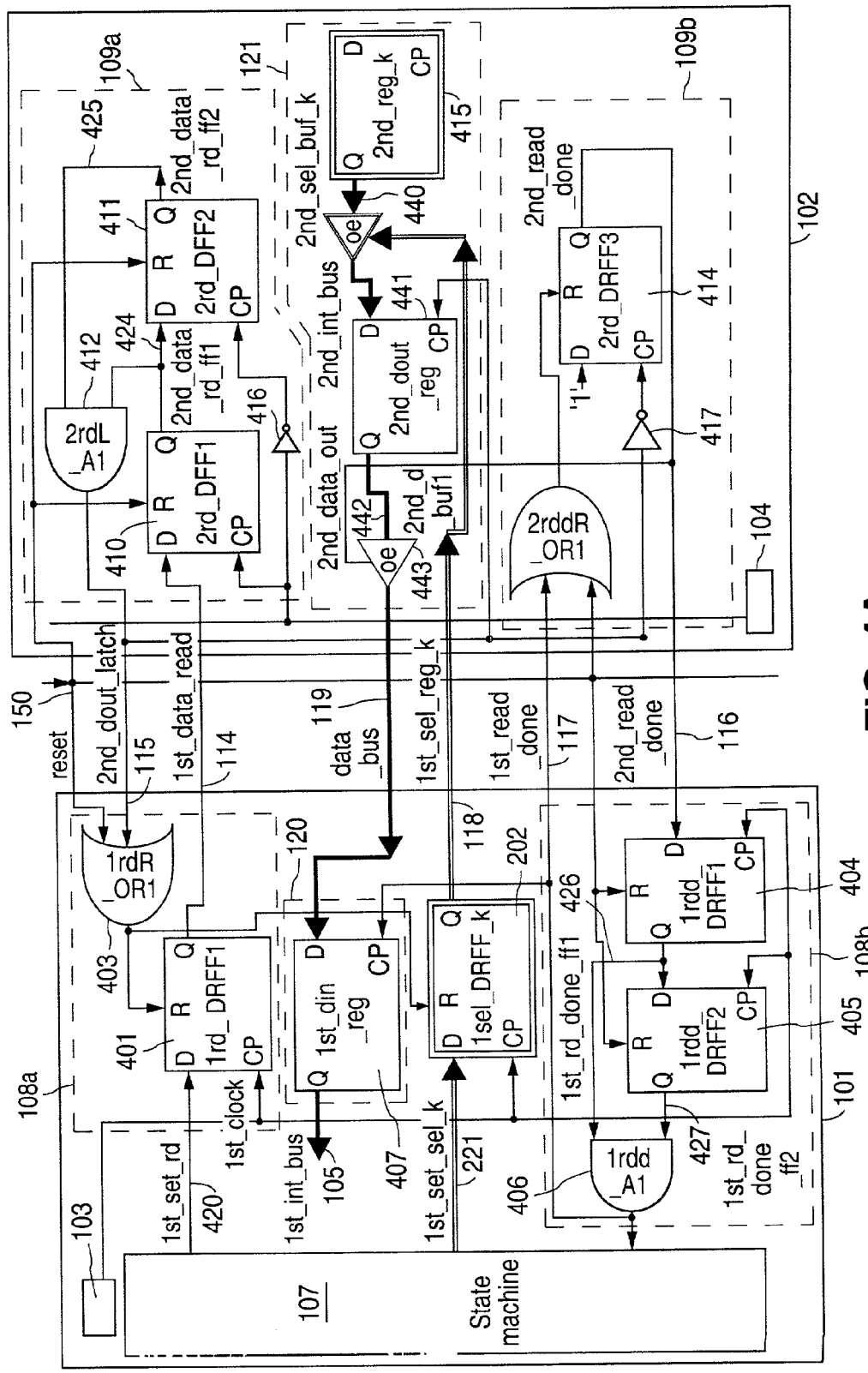
FIG. 4A schematically illustrates a more detailed block diagram showing a first case of a read operation into a first digital circuit from a second digital circuit according to an advantageous embodiment of the invention.

FIG. 4A schematically illustrates a first case of a read operation where the clock frequency domain 103 of first circuit 101 (first clock 103) is faster than the clock frequency domain 104 of second circuit 102 (second clock 104). In first circuit 101 state machine 107 initiates the read operation by setting signal 1st_set_rd 420 as shown in the timing diagram of FIG. 5A by event zero ("0") (designated with reference numeral 511) at the first clock cycle ("clock cycle 1"). At the same time, state machine 107 sets an appropriate address with one of the N+1 select signals 1st_set_sel_k 221 (k=0, . . . , N). Then in the next cycle (shown in the timing diagram of FIG. 5A as event "I-a" in "clock cycle 2") flip-flop 1rd_DRFF1 401 sets the output signal 1st_data_read 114 on the rising edge of first clock 103. At this clock cycle the signals 1st_set_rd 420 and the appropriate signal from the group of signals 1st_set_sel_k 221 will be inactivated by the state machine 107. Circuit 102 will sample the signal 1st_data_read 114 into flip-flop 2rd_DFF1 410 on the rising edge of second clock 104 to generate signal 2nd_data_rd_ff1 424. If the setup time or hold time of the signal 1st_data_read 114 relative to second clock 104 is not enough to generate a stable signal in the output of flip flop 2rd_DFF1 410, then signal 2nd_data_rd_ff1 424 will have an undefined logic value or a "metastability" state (shown as a small spike in the timing diagram of FIG. 5A as event "I-b"). This small spike will either decline to a zero ("0") state (i.e., a low level voltage value) or will be able to go to a one ("1") state (i.e., a high level voltage value). If FIG. 5A, the signal 2nd_data_rd_ff1 424 is shown declining to a zero ("0") state so that at the next rising edge of the second clock 104 (i.e., shown in the timing diagram of FIG. 5A as event "II") the signal 2nd_data_rd_ff1 424 will be set to a one ("1") level while 2nd_data_rd_ff2 425 is still at the zero ("0") level.

The signal 2nd_data_rd_ff1 424 will be sampled on the next falling edge of the second clock 104 into flip flop 2rd_DFF2 411 (shown in the timing diagram of FIG. 5A as event "III-a"), causing signal 2nd_data_rd_ff2 425 to be set to a one ("1") level. When 2nd_data_rd_ff2 425 is set to a one ("1") level it goes to logic AND gate 2rdL_A1 412 together with the signal 2nd_data_rd_ff1 424 and generates the signal 2nd_dout_latch 115 (shown in the timing diagram of FIG. 5A as event "III-b").

The metastability problem is solved by sampling the asynchronous signal 1st_data_read 114 from first circuit 101 two times within control logic unit 109a of second circuit 102. Signal 1st_data_read 114 is first sampled in flip flop 2rd_DFF1 410 using the second clock 104 as the Clock Pulse (CP) input for flip-flop 2rd_DFF1 410 to generate signal 2nd_data_rd_ff1 424. Signal 2nd_data rd_ff1 224 is then sampled in flip flop 2rd_DFF2 411 using second clock signal 104 (through inverter 416) as the Clock Pulse (CP) input for flip-flop 2rd_DFF2 411 to generate 2nd_data_rd_ff2 425.

The output signal 2nd_data_rd_ff1 424 from flip-flop 2rd_DFF1 410 and the output signal 2nd_data_rd_ff2 425 from flip-flop 2rd_DFF2 411 are provided to the inputs of the logic AND gate 2rdL_A1 412 which performs a logical AND operation. The output of the logic AND gate 2rdL_A1 412 will not go to a one ("1") level unless both signals, 2nd_data_rd_ff1 424 and 2nd_data_rd_ff2 425, are set to the one ("1") level. The second signal 2nd_data_rd_ff2 425 will not be set to the one ("1") level unless the first signal 2nd_data_rd_ff1 424 has a stable one ("1") level on the second sampling edge of the second clock 104 (shown in the timing diagram of FIG. 5A by event "III-a"). This guarantees that the signal 2nd_dout_latch 115 will not be activated by a metastability state in 2nd_data_rd_ff1 424. That is, the signal 2nd_dout_latch 115 will not be set unless the output of both flip-flop 2rd_DFF1 410 and flip-flop 2rd_DFF2 411 are set.

In the other direction, when the signal 2nd_dout_latch 115 is to be reset (i.e., inactivated to a zero ("0") level) there is no metastability problem because the signal 1st_data_read 114 is inactivated synchronously to the second clock 104.

The appropriate signal from the group of signals 1st_sel_reg_k 118 will enable only one buffer from the group of tri-state buffers 2nd_sel_buf_k 440 (k=0, 1, . . . , N) in the second circuit 102 to drive out the appropriate data from the chosen register from the group of registers 2nd_reg_k 415 (k=0, 1, . . . , N) to the input "D" of flip flop 2nd_dout_reg 441. This operation is an asynchronous operation in the second circuit 102 because the signal from 1st_sel_reg_k 118 (k=0, 1, . . . , N) is set in the first circuit 101 together with signal 1st_data_read 114. The register 2nd_dout_reg 441 cannot sample the data input using second clock 104, but it can sample the data using signal 2nd_dout_latch 115.

Figure 5A:
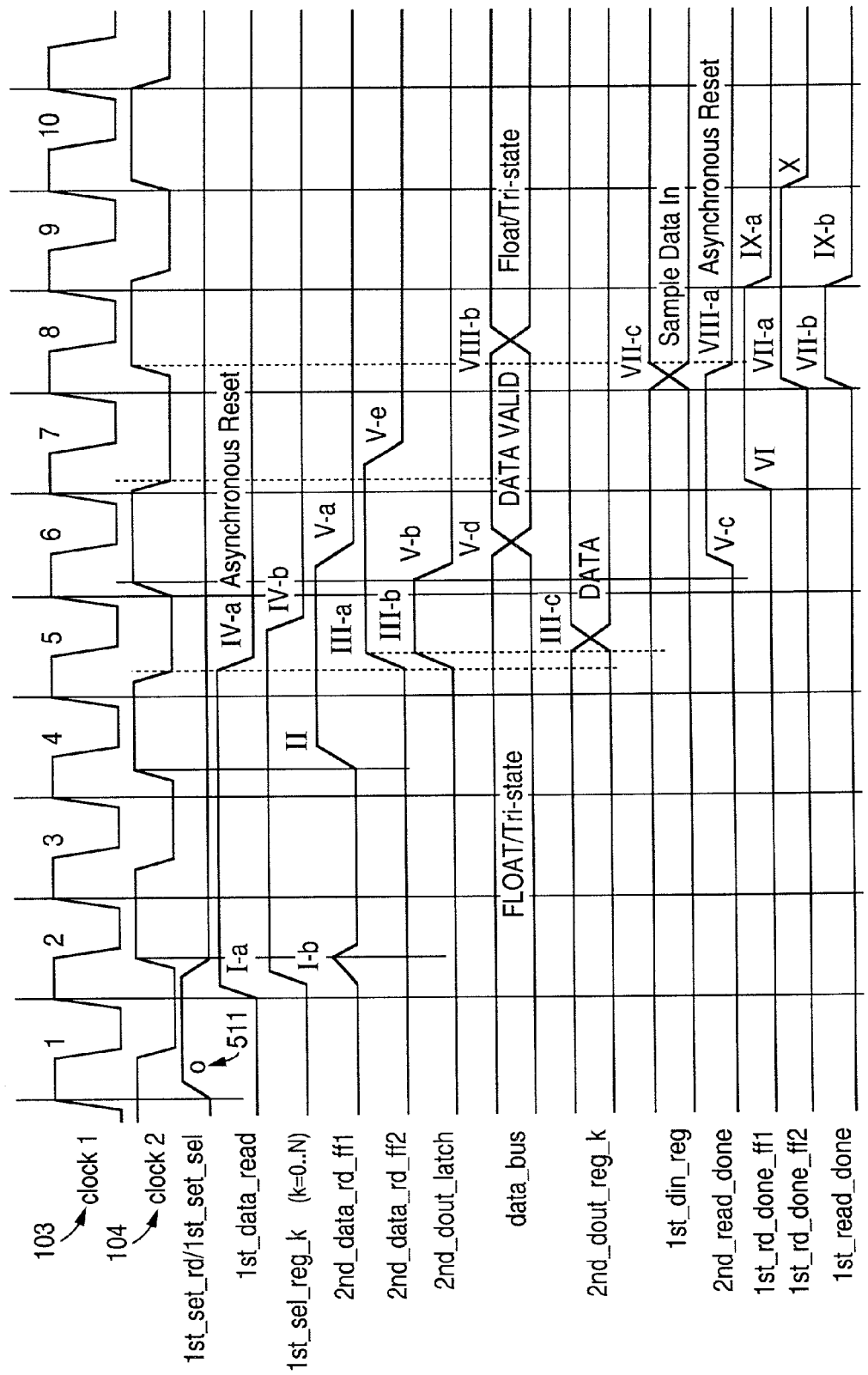
FIG. 5A is a timing diagram illustrating the operation of the first case of a read operation shown in FIG. 4A.

The signal 2nd_dout_latch 115 undertakes the following operations on its rising edge:

In the second circuit 102, the signal 2nd_dout_latch 115 samples the input data into the register 2nd_dout_reg 441 and drives the data onto 2nd_data_out 442 (shown in the timing diagram of FIG. 5A as event "III-c").

Signal 2nd_dout_latch 115 also goes to first circuit 101 and passes through logic OR gate 1rdR_OR1 403 to both flip flop 1rd_DRFF1 401 and to flip flop 1sel_DRFF_k 202. The signal 2nd_dout_latch 115 asynchronously resets the signal 1st_data_read 114 in flip flop 1rd_DRFF1 401 (shown in the timing diagram of FIG. 5A as event "IV-a") and asynchronously resets the appropriate signal from the group 1st_sel_reg_k 221 (shown in the timing diagram of FIG. 5A as event "IV-b").

The inactivation of the signal 1st_data_read 114 is synchronized with the falling edge of second clock 104 in such a manner that this change will be sampled by the next rising edge of second clock 104 into flip flop 2rd_DFF1 410 causing signal 2nd_data_rd_ff1 424 to go inactive to a zero ("0") level (shown in the timing diagram of FIG. 5A as event "V-a"). This sampling will not generate any metastability problem in second circuit 102, so it can be used directly without any need to sample it two times. Consequently, signal 2nd_dout_latch 115 will be inactivated to a zero ("0") level (shown in the timing diagram of FIG. 5A as event "V-b").

The signal 2nd_data_rd_ff1 424 will be sampled into the flip flop 2rd_DFF2 441 and will cause signal 2nd_data_rd_ff2 425 to be inactivated to a zero ("0") level on the next falling edge of clock 104 (shown in the timing diagram of FIG. 5A as event "V-e").

The falling edge of signal 2nd_dout_latch (shown in the timing diagram of FIG. 5A as event "V-b") will go through inverter 417 to the Clock Pulse (CP) input of flip flop 2rd_DRFF3 414 and set the signal 2nd_read_done 116 (shown in the timing diagram of FIG. 5A as event "V-c").

Signal 2nd_read_done 116 will go to input "oe" of output buffer 2nd_d_buf1 443 and will enable the buffer to drive the data from 2nd_data_out 442 to the data bus 119 in the direction of the first circuit 101.

Signal 2nd_read_done 116 will go from second circuit 102 to first circuit 101, being sampled twice into flip flop 1rdd_DRFF1 404 and into flip flop 1rdd_DRFF2 405 (using first clock 103), and setting two signals 1st_rd_done_ff1 426 and 1st_rd_done_ff2 427 in two consecutive cycles of first clock 103 (shown in the timing diagram of FIG. 5A as event "VI" and event "VII-a"). The sampling is done in accordance with the same method previously described for sampling 1st_data_read 114 in second circuit 102, but in this instance, both samples are done on the rising edge of clock 103 in first circuit 101.

The metastability problem is again solved by twice sampling the asynchronous signal 2nd_read_done 116 and performing a logical AND operation between the two sampled signals 1st_rd_done_ff1 426 and 1st_rd_done_ff2 427. In a manner similar to that previously described, the output signal 1st_read_done 117 of the AND gate 1rdd_A1 406 will not go to a one ("1") level (shown in the timing diagram of FIG. 5A as event "VII-b") unless both signals 1st_rd_done_ff1 426 and 1st_rd_done_ff2 427 are set to a one ("1") level. Furthermore, the signal 1st_rd done_ff2 427 will not be set to a one ("1") level unless the signal 1st_rd_done_ff1 426 has a stable one ("1") level on the second rising edge of first clock 103. The inactivation of signal 2nd_read_done 116 will be synchronous to the domain of the first clock 103, so that there will not be a metastability problem when the signal 1st_rd_done_ff1 426 is inactivated.

FIG. 5A shows the setting of the signals and the timing related to the signals in a first case of a read operation into the first circuit 101 from the second circuit 102 in accordance with the operation illustrated in FIG. 4A. The first case is represents a read operation when the first clock frequency 103 of the first circuit 101 is greater than the second clock frequency 104 of the second circuit 102.

Figure 4B:
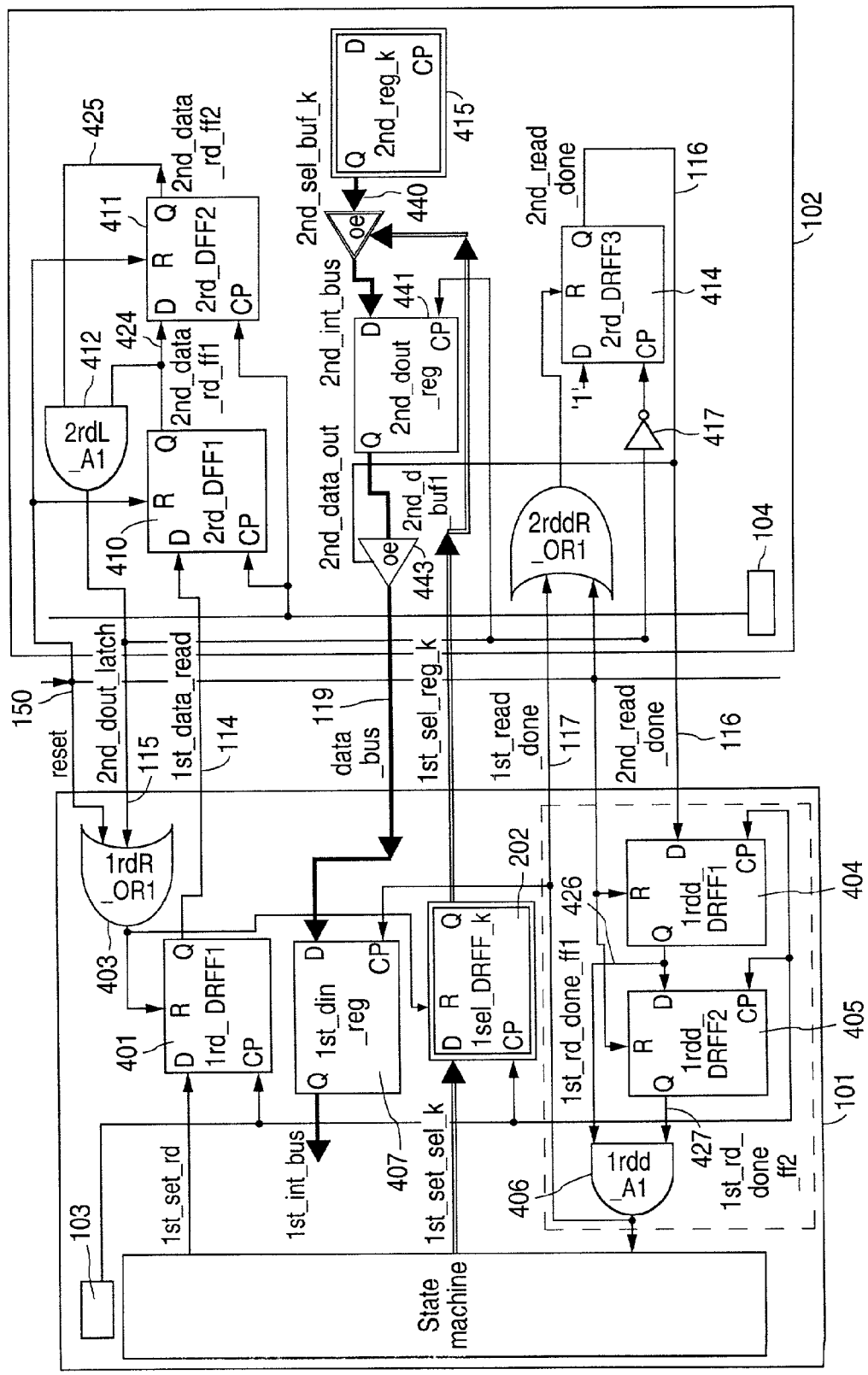
FIG. 4B schematically illustrates a more detailed block diagram showing a second case of a read operation into a first digital circuit from a second digital circuit according to an advantageous embodiment of the invention.

FIG. 4B schematically illustrates a second case of a read operation into first digital circuit 101 from second digital circuit 102, according to an alternate advantageous embodiment of the invention. In this second case, the first clock frequency 103 of the first circuit 101 is less than the second clock frequency 104 of the second circuit 102. Therefore the inverter 416 that was used in the second circuit 102 of FIG. 4A is deleted from the second circuit 102 of FIG. 4B. Except for not using inverter 416, the read operation that is performed in the second case is identical to the read operation that is performed in the first case as described above with reference to FIG. 4A and FIG. 5A.

Figure 5B:
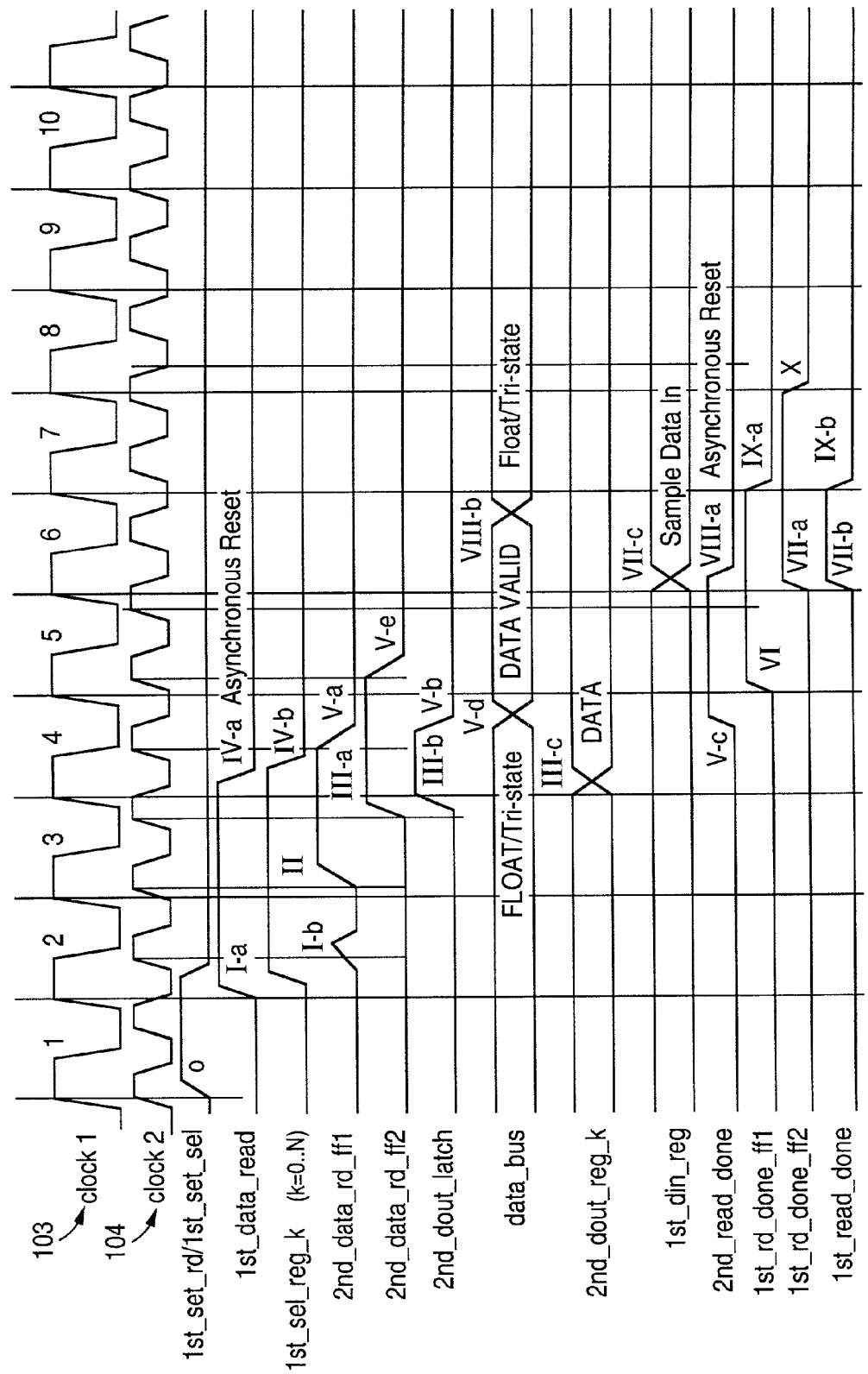
FIG. 5B is a timing diagram illustrating the operation of the second case of a read operation shown in FIG. 4B.

FIG. 5B shows the setting of the signals and the timing related to the signals in the second case of a read operation into the first circuit 101 from the second circuit 102. The second case represents a read operation where the first clock frequency 103 of the first circuit 101 is less than the second clock frequency 104 of the second circuit 102. In addition, the timing of the read operation in the second case is shorter than the timing of the read operation in the first case as can be easily seen by comparing the timing diagrams of FIG. 5A and FIG. 5B.

Figure 6:
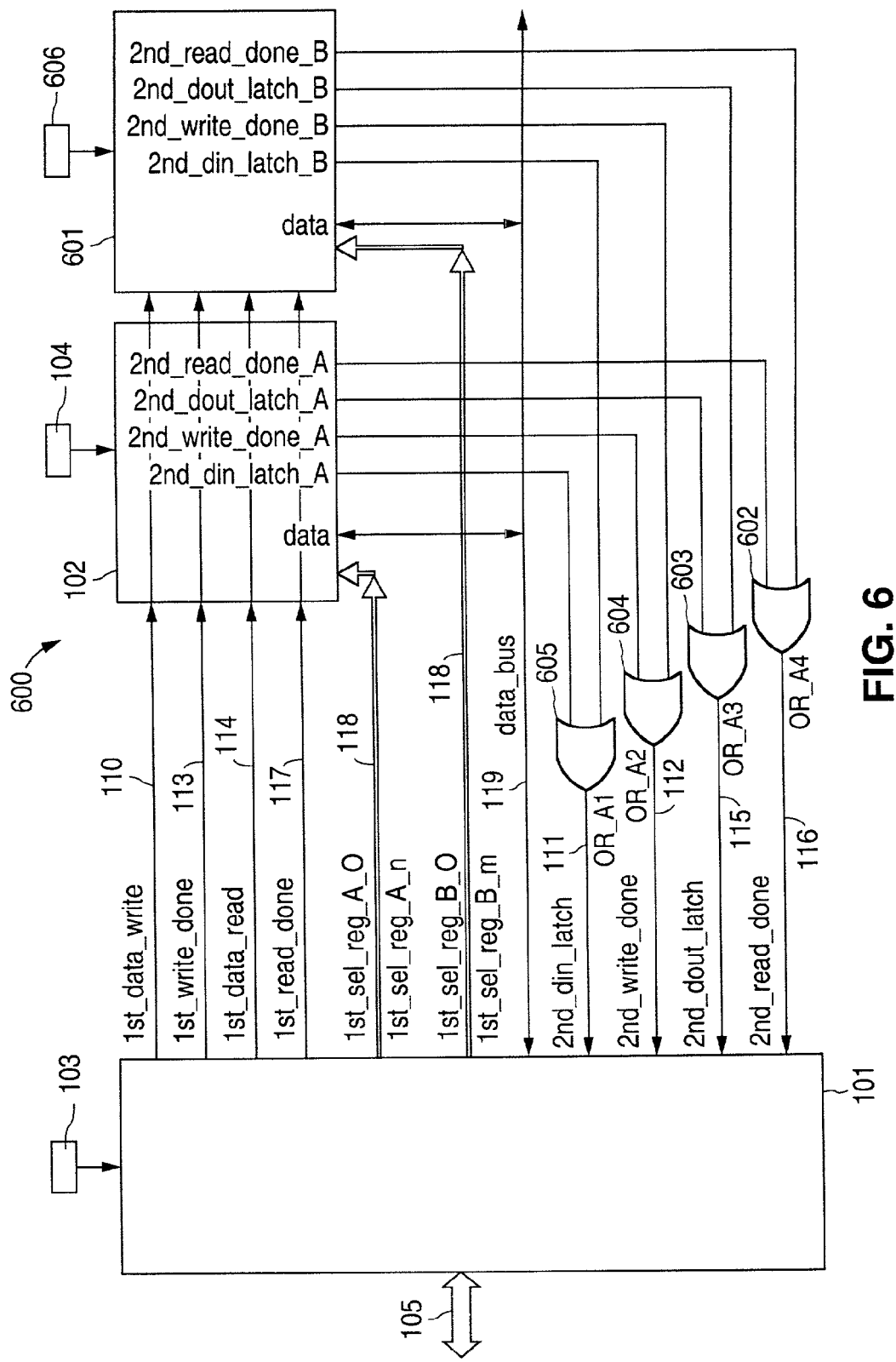
FIG. 6 schematically illustrates a more detailed block diagram showing how data may be transferred between a first digital circuit and a plurality of second digital circuits according to an alternate advantageous embodiment of the invention.

FIG. 6 schematically illustrates a digital circuit 600 for transferring data between a first circuit 101 (master circuit 101) and a plurality of slave circuits (represented by second circuit 101 and second circuit 601) according to an alternate advantageous embodiment of the invention. The output signals from the master circuit (first circuit 101) are connected in parallel to all the other slave circuits (second circuit 102 and second circuit 601) in a manner that was previously described with reference to FIG. 1. The signals provided from the slave circuits (second circuit 102 and second circuit 601) to the master circuit (first circuit 101), are connected through logical OR circuits (i.e., logical OR gates 602 through 605) in a manner that was previously described with reference to FIG. 1. Each slave circuit has its own clock domain (e.g., clock domain 606 provides the clock frequency for slave circuit 601).

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for preventing metastability during transfer of data between a first circuit operating at a first clock frequency and at least one second circuit operating at a second clock frequency that is asynchronous with respect to said first clock frequency, said method comprising the steps of:

sending a first asynchronous control signal from said first circuit to said at least one second circuits;

sampling said fist asynchronous control signal at least two times within said at least one second circuit;

synchronizing said first circuit and said at least one second circuit using at least two samples of said first asynchronous control signal; and transferring data between said first circuit and said at least one second circuit when said first circuit and said at least one second circuit are synchronized.

2. A method as claimed in claim 1 wherein said step of sampling said first asynchronous control signal from said first circuit at least two times within said at least one second circuit comprises the steps of:

sampling said first asynchronous control signal in a first flip flop circuit within said at least one second circuit during a clock cycle to obtain a first sample of said first asynchronous control signal; and sampling an output of said first flip flop circuit in a second flip flop circuit connected in series with said first flip flop circuit during a subsequent clock cycle to obtain a second sample of said first asynchronous control signal.

3. A method as claimed in claim 2 wherein said step of synchronizing said first circuit and said at least one second circuit using at least two samples of said first asynchronous control signal comprises the steps of:

providing said first sample of said first asynchronous control signal to a first input of a first logical AND gate within said at least one second circuit;

providing said second sample of said first asynchronous control signal to a second input of said first logical AND gate; and providing an output of said first logical AND gate to said first circuit to indicate that said first circuit and said at least one second circuit are synchronized.

4. A method as claimed in claim 2 wherein said step of sampling said first asynchronous control signal said first flip flop circuit within said at least one second circuit during a clock cycle to obtain said first sample of said first asynchronous control signal comprises the step of:

providing a clock pulse from said second clock frequency to said first flip flop to generate said first sample of said first asynchronous control signal.

5. A method as claimed in claim 4 wherein said step of sampling an output of said first flip flop circuit in a second flip flop circuit connected in series with said first flip flop circuit during a subsequent clock cycle to obtain said second sample of said first asynchronous control signal comprises the step of:

providing an inverted clock pulse from said second clock frequency to said second flip flop to generate said second sample of said first asynchronous control signal.

6. A method as claimed in claim 3 further comprising the steps of:

using said output of said first logical AND gate to asynchronously reset said first asynchronous control signal in said first circuit; and using said output of said first logical AND gate as a synchronous control signal in said at least one second circuit.

7. A method as claimed in claim 1 further comprising the step of:

transferring data from said first circuit to said at least one second circuit when said first circuit and said at least one second circuit are synchronized.

8. A method as claimed in claim 1 further comprising the step of:

transferring data to said first circuit from said at least one second circuit when said first circuit and said at least one second circuit are synchronized.

9. A method as claimed in claim 8 further comprising the step of:

sending a data signal from said first circuit to said at least one second circuit to cause said at least one second circuit to transfer data to said first circuit.

10. A method as claimed in claim 6 further comprising the steps of:

sending a second asynchronous control signal from said at least one second circuit to said first circuit;

sampling said second asynchronous control signal at least two times within said first circuit;

synchronizing said at least one second circuit and said first circuit using at least two samples of said second asynchronous control signal; and sending a data signal to said first circuit from said at least one second circuit when said first circuit and said at least one second circuit are synchronized to indicate that a transfer of data between said first circuit and said at least one second circuit has been completed.

11. A method as claimed in claim 10 wherein said step of sampling said second asynchronous control signal from said at least one second circuit at least two times within said first circuit comprises the steps of:

sampling said second asynchronous control signal in a third flip flop circuit within said at first circuit during a clock cycle to obtain a first sample of said second asynchronous control signal; and sampling an output of said third flip flop circuit in a fourth flip flop circuit connected in series with said third flip flop circuit during a subsequent clock cycle to obtain a second sample of said second asynchronous control signal.

12. A method as claimed in claim 11 wherein said step of synchronizing said at least one second circuit and said first circuit using at least two samples of said second asynchronous control signal comprises the steps of:

providing said first sample of said second asynchronous control signal to a first input of a second logical AND gate within said first circuits;

providing said second sample of said second asynchronous control signal to a second input of said second logical AND gate; and providing an output of said second logical AND gate to said at least one second circuit to indicate that said at least one second circuit and said first circuit are synchronized.

13. A method as claimed in claim 11 wherein said step of sampling said second asynchronous control signal in said third flip flop circuit within said first circuit during a clock cycle to obtain a first sample of said second asynchronous control signal comprises the step of:

providing a clock pulse from said first clock frequency to said third flip flop to generate said first sample of said second asynchronous control signal.

14. A method as claimed in claim 13 wherein said step of sampling an output of said third flip flop circuit in a fourth flip flop circuit connected in series with said third flip flop circuit during a subsequent clock cycle to obtain a second sample of said second asynchronous control signal comprises the step of:

providing a clock pulse from said first clock frequency to said fourth flip flop to generate said second sample of said second asynchronous control signal.

15. A method as claimed in claim 12 further comprising the steps of:

using said output of said second logical AND gate to asynchronously reset said second asynchronous control signal in said at least one second circuit; and using said output of said second logical AND gate as a synchronous control signal in said first circuit.

16. An apparatus for preventing metastability during a transfer of data between a first circuit that operates at a first clock frequency and at least one second circuit that operates at a second clock frequency that is asynchronous with respect to said first clock frequency, said apparatus comprising:

a first control circuit within said first circuit capable of sending a first asynchronous control signal to said at least one second circuit;

a first sampling circuit within said at least one second circuit capable of sampling said first asynchronous control signal at least two times;

a first synchronization circuit within said at least one second circuit capable of synchronizing said first circuit and said at least one second circuit using at least two samples of said first asynchronous control signal; and a circuit capable of transferring data between said fist circuit and said at least one second circuit when said first circuit and said at least one second circuit are synchronized.

17. An apparatus as claimed in claim 16 wherein said first sampling circuit comprises:

a first flip flop circuit capable of being sampled during a clock cycle to obtain a first sample of said first asynchronous control signal; and a second flip flop circuit connected in series with said first flip flop circuit, wherein said second flip flop circuit is capable of sampling an output of said first flip flop circuit during a subsequent clock cycle to obtain a second sample of said first asynchronous control signal.

18. An apparatus as claimed in claim 17 wherein said first snchronization circuit comprises a first logical AND gate within said at least one second circuit, wherein a first input of said first logical AND gate is coupled to said first sample of said first asynchronous control signal, and wherein a second input of said first logical AND gate is coupled to said second sample of said first asynchronous control signal; and wherein an output of said first logical AND gate is coupled to said first circuit.

19. An apparatus as claimed in claim 17 wherein a clock pulse input of said first flip flop circuit is coupled to a clock signal of said second clock frequency to enable said first flip flop circuit to receive said clock signal to generate said first sample of said first asynchronous control signal.

20. An apparatus as claimed in claim 19 wherein a clock pulse input of said second flip flop circuit is coupled to an inverted clock signal of said second clock frequency to enable said second flip flop circuit to receive said inverted clock signal to generate said second sample of said first asynchronous control signal.

21. An apparatus as claimed in claim 18 wherein said first circuit is capable of using an output of said first logical AND gate to asynchronously reset said first asynchronous control signal in said first circuit, and wherein said at least one second circuit is capable of using said output of said first logical AND gate as a synchronous control signal.

22. An apparatus as claimed in claim 16 wherein said first circuit is capable of transferring data to said at least one second circuit when said first circuit and said at least one second circuit are synchronized.

23. An apparatus as claimed in claim 16 wherein said at least one second circuit is capable of transferring data to said first circuit when said first circuit and said at least one second circuit are synchronized.

24. An apparatus as claimed in claim 23 wherein said first circuit is capable of sending a data signal to said at least one second circuit to cause said at least one second circuit to transfer data to said first circuit.

25. An apparatus as claimed in claim 21, said apparatus further comprising:

a second control circuit within said at least one second circuit capable of sending a second asynchronous control signal to said first circuit;

a second sampling circuit within said first circuit capable of sampling said second asynchronous control signal at least two times;

a second synchronization circuit within said first circuit capable of synchronizing said first circuit and said at least one second circuit using at least two samples of said second asynchronous control signal; and a circuit capable of sending a data signal to said first circuit from said at least one second circuit when said first circuit and said at least one second circuit are synchronized to indicate that a transfer of data between said first circuit and said at least one second circuit has been completed.

26. An apparatus as claimed in claim 25 wherein said second sampling circuit comprises:

a third flip flop circuit capable of being sampled during a clock cycle to obtain a first sample of said second asynchronous control signal; and a fourth flip flop circuit connected in series with said third flip flop circuit, wherein said fourth flip flop circuit is capable of sampling an output of said third flip flop circuit during a subsequent clock cycle to obtain a second sample of said second asynchronous control signal.

27. An apparatus as claimed in claim 26 wherein said second synchronization circuit comprises a second logical AND gate within said first circuit, wherein a first input of said second logical AND gate is coupled to said first sample of said second asynchronous control signal, and wherein a second input of said second logical AND gate is coupled to said second sample of said second asynchronous control signal; and wherein an output of said second logical AND gate is coupled to said at least one second circuit.

28. An apparatus as claimed in claim 26 wherein a clock pulse input of said third flip flop circuit is coupled to a clock signal of said first clock frequency to enable said third flip flop circuit to receive said clock signal to generate said first sample of said second asynchronous control signal.

29. An apparatus as claimed in claim 28 wherein a clock pulse input of said fourth flip flop circuit is coupled to a clock signal of said first clock frequency to enable said fourth flip flop circuit to receive said clock signal to generate said second sample of said second asynchronous control signal.

30. An apparatus as claimed in claim 27 wherein said at least one second circuit is capable of using an output of said second logical AND gate to asynchronously reset said second asynchronous control signal in said at least one second circuit, and wherein said first circuit is capable of using said output of said second logical AND gate as a synchronous control signal.

* * * * *

UNITED STATES PATENT AND TRADEMARK OFFICE
CERTIFICATE OF CORRECTION

PATENT NO. : 7,027,542 B1
APPLICATION NO. : 10/122624
DATED : April 11, 2006
INVENTOR(S) : Elias Shihadeh It is certified that error appears in the above-identified patent and that said Letters Patent is hereby corrected as shown below:

Column No. 14, Line No. 56 change "fist" to --first--

Column No. 15, Line No. 23 add --in-- between "signal" and "said"

Signed and Sealed this

Fifteenth Day of August, 2006

JON W. DUDAS
*Director of the United States Patent and Trademark Office*